3,827,897
PROCESS OF OBTAINING A DRY AND POWDERY MIXTURE OF HYDRATED LIME AND PLASTER
Philippe Dumont, Stockay, Belgium, assignor to Carriere et Fours a Chaux Dumont-Wautier, La Mailleue, Belgium
Filed May 31, 1972, Ser. No. 258,287
Claims priority, application Great Britain, June 9, 1971, 19,725/71
Int. Cl. C04b 11/06
U.S. Cl. 106—110     3 Claims

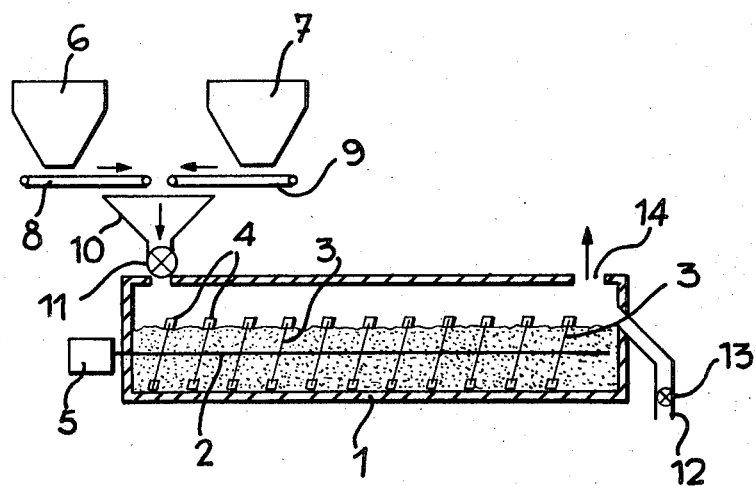

ABSTRACT OF THE DISCLOSURE

For obtaining a building material containing hydrated lime and plaster, quicklime is reacted with synthetic gypsum, such as phosphogypsum which is a byproduct of the manufacture of phosphoric acid, the reaction taking place without external heating in a reaction zone in which a water saturated atmosphere is maintained.

BACKGROUND OF THE INVENTION

(1) Field of the Invention

Mortars based on hydrated lime [$Ca(OH)_2$] and plaster [$CaSO_4 \cdot \frac{1}{2} H_2O$] are commonly used in the building field as coating for ceiling-works or as starting material for the manufacture of plates or panels used as separating or covering elements.

In addition to the incorporation of fibers, sand and organic materials, such as thickening agents (for example, methylcellulose) or hardening retarders (for example, keratin) or other materials for the purpose of improving certain characteristics such as the plasticity, the hardening duration or the resistance, the proportions of lime and plaster may vary, in said mortars, from 1 to 9 parts by weight of plaster for 1 part of hydrated lime.

(2) DESCRIPTION OF PRIOR ART

It is known to prepare mixed plaster-lime mortars by mixing powdery hydrated lime ([$Ca(OH)_2$]) resulting from the dry slacking of quicklime, with plaster [$CaSO_4 \cdot \frac{1}{2} H_2O$] manufactured according to the usual processes of burning gypsum.

Said mixture can be prepared by the user at the place where the mortar has to be used. However, such mixtures are more frequently prepared in a factory and supplied to users in powdery and dry condition.

The use of the mixture, to which various agents such as hardening retarders and thickening agents may be added, needs only the addition of water for obtaining a mortar which is thus quite easy to prepare.

However, the high cost of the starting materials i.e. plaster and hydrated lime, which are elaborated products and can only be obtained by important industrial operations, as well as the transporting costs of these materials from the production plant to the manufacturer which will prepare the mixture adversely affect the cost of the mixture of said starting materials.

On the other hand, it is well known to react quicklime with natural gypsum or gypsite at a temperature of more than 150° C., so as to obtain a mixture of hydrated lime and plaster, according to the following equation:

(I) 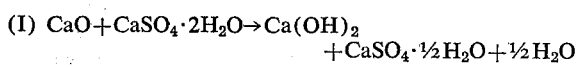

During this reaction an exchange of materials and heat takes place between the quicklime and the natural gypsum; the removal of the crystal water of the gypsum is caused by the heat resulting from the hydration reaction of the quicklime, the water absorbed by the quicklime resulting from the dehydration of the natural gypsum.

It seems that this known process has never been successfully used on an industrial scale, for the following reasons:

1.—When natural rock gypsum is used, the conversion of said gypsum into plaster is effected easier and more economically by a conventional process, such as firing in a rotating furnace and heating by flame radiation.

2.—Natural gypsum has a poor reactivity so that the amount of quicklime which is necessary for the reaction is important.

Under these circumstances, the mixture of hydrated lime and plaster must necessarily contain a proportion of hydrated lime of more than 50% by weight.

This high proportion of hydrated lime affects the quality of the mixture, if used as a coating for ceiling-works. It has been found, in this respect, that when a mortar of hydrated lime and plaster contains more than 30% by weight of hydrated lime, some properties of the coatings made with said mortar, such as adherence, the shrinking ability, the hardness and the bending and compression strength are badly affected.

Moreover, the need of using a great quantity of quicklime substantially increases the cost price of the mixture.

3.—When natural gypsum is used, the minimum amount of quicklime to be used must be such that the total of the crystal water contained in the gypsum is absorbed by the quicklime. This corresponds to a minimum ratio of 0.65 parts of quicklime for 1 part of natural gypsum, so that the obtained mixture of hydrated lime and plaster contains 50% of each of these ingredients.

4.—When natural gypsum is used, it is very important to mix it very intimately with quicklime, so as to obtain, as far as possible, a constant reaction temperature and to avoid local overheatings which would result in raising the temperature of the reaction mass to a value at which the heminhydrate is converted into soluble anhydrite (163° C. or insoluble anhydride (200° C.).

In view of the excess of quicklime to be used and in view of the fact that the apparatus used for the reaction are not suitable for avoiding the production of anhydrite, it is necessary to submit the mixture of hydrated lime and plaster obtained from quicklime and natural gypsum to a further step, for the conversion of the anhydrite which is present in said mixture into plaster, such a conversion taking place by contact with the air moisture or by addition of water.

5.—For improving the reactivity of natural gypsum and reduce thereby the duration of reaction of said gypsum, it is necessary to reduce the particle size of the natural gypsum. This involves an additional step which increases the cost price of the mixture of hydrated lime and plaster.

SUMMARY OF THE INVENTION

This invention has for its object the manufacture of a mixture of hydrated lime and plaster by a process wherein the above drawbacks are avoided.

According to this invention, a synthetic gypsum, such as phosphogypsum which is a by-product of the manufacture of phosphoric acid, is reacted with quicklime, for obtaining a dry and powdery mixture of hydrated lime and plaster, according to the following equation:

(II) 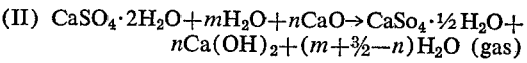

$m$ being possibly equal to zero, whereas
$n$ is a coefficient which is selected in accordance with the amount of hydrated lime which is desired in the obtained mixture of hydrated lime and plaster.

DETAILED DESCRIPTION OF THE INVENTION

According to the relative proportions of synthetic gypsum, free water (if any) and quicklime, the reaction (II) does not need a heat source, except the heat supplied by the exothermic reaction of hydration of the quicklime when in contact with the crystal water and the humidity of the gypsum or water added to the reaction mixture.

Said reaction starts at a temperature of more than 100° C. and takes place preferably at a temperature of more than 150° C.

The minimum temperature at which synthetic gypsum is converted into plaster is quickly reached by the reaction between the quicklime and the free water which is generally contained in the synthetic gypsum.

According to an important feature of the invention the reaction between synthetic gypsum and quicklime is effected in a reaction zone wherein a saturated water atmosphere is maintained.

Taking into account the sensible heat of the obtained mixture, the total thermic balance of reaction (II) is equal to (III) $\Delta H_{total} = 20{,}715 + 12{,}139m - 25{,}130n$ (calories/mol of gypsum).

In equation (III), the numerical values are taken from Chemical Engineers Handbook, edited by John H. Perry, 4th edition.

The needed minimum amount of quicklime per mol of synthetic gypsum, for achieving a completion of reaction (II), i.e. for converting the whole of the dihydrated calcium sulphate (gypsum) into the corresponding hemihydrated salt (plaster), and the amount of quicklime which is necessary for removing the possible moisture content of the synthetic gypsum and for pre-heating the mass corresponds to equation (IV) $\Delta H_{total} = 0$ In the practice, it is of course necessary to take into account the heat losses due to the heat-insulation of the reaction zone, as well as the purity and the degree of calcination of the quicklime.

It has been found that a very reactive quicklime, i.e. a quicklime which has a great chemical affinity towards water, such as a quicklime which is obtained in a rotating furnace or which is calcined in a vertical furnace by means of a liquid or gaseous fuel, is very suitable as a reagent in reaction (II).

According to another feature of the invention, the minimum amount of very reactive quicklime used in the process according to this invention is of about 1 part by weight for about 4 parts by weight of dry synthetic gypsum.

The use of very reactive quicklime in powder form is essential for a complete conversion of quicklime into hydrated lime.

The presence of unreacted calcium oxide in the obtained mixture of hydrated lime and plaster has to be avoided, since it would create, when a coating is made by means of a mortar containing said mixture, local blistering resulting from the expansion of the calcium oxide which would be converted into calcium hydroxide, when in contact with the water added to said mixture for obtaining the mortar.

Moreover, the use of very reactive quicklime strongly reduces the duration of the reaction with natural gypsum and, due to the large amount of released heat, it allows yields of at least 85% in respect of the theoretical values mentioned in equation (III).

In order to achieve complete hydration of the quicklime, an homogeneous temperature of the reacting mass and a minimum loss of heat, it is advisable to use a mixer of the type shown in the attached drawing which shows schematically a vertical section of such a mixer.

Said mixer comprises a hemicylindrical container 1 having an horizontal axis and wherein the reagents are intimately mixed. A shaft 2 equipped with inclined arms 3 provided at each end with stirring blades 4 extends horizontally in container 1 and is connected to a motor 5 which may be actuated at different speeds.

Quicklime and synthetic gypsum discharged respectively from a hopper 6 and a hopper 7 on conveyors 8, 9 are collected into a feed hopper 10. By the opening of a rotating valve 11, said starting materials are introduced into the mixer 1, the walls of which are heat insulated.

A water saturated atmosphere is maintained in the mixer 1, from which the obtained mixture is discharged by overflow into a discharge pipe 12 through a rotating valve 13.

Adjacent to the end of the mixer 1 where the obtained mixture of hydrated lime and plaster is discharged, the mixer is provided with an opening 14 for the removal of the excess of water.

In such a type of apparatus, it is quite easy to control, during the advancement of the reacting mixture from the feed and to the discharge end, the temperature of said mixture.

If the user wishes to obtain a product containing a larger amount of hydrated lime than the minimum amount of calcium oxide which is necessary for the drying and conversion of the total amount of synthetic gypsum into plaster, it is only necessary to introduce a larger quantity of quicklime as well as a suitable amount of water into the mixer, so as to maintain the temperature of the reaction medium at the desired value and to avoid the formation of anhydrite.

The apparatus may be equipped with heating means (not shown) which are merely used for heating the mixture of quicklime and synthetic gypsum at a temperature of about 150° C. in order to initiate the reaction.

The following illustrative examples describe the process according to this invention.

EXAMPLE 1

In an apparatus as shown in FIG. 1, 789 kg. of moisture free ($m=0$) phosphogypsum have been mixed with 211 kg. of quicklime which has been produced in a rotating furnace, the particle size of the phosphogypsum and of the quicklime being comprised between 0–2 millimeters.

Due to the absence of free water in the phosphogypsum, quicklime and water have been initially added in a proportion of 1 part of quicklime for 0.3 parts of water for initiating the reaction, i.e. for bringing the reaction mixture to a temperature of more than 100° C.

The reagents (phosphogypsum and quicklime) have been progressively introduced into the reactor during three hours. During this period, 1.2 kg. of quicklime and 4.4 kg. of phosphogypsum have been introduced per minute into the reactor, whereas the temperature has been maintained at about 160° C. without external heating.

The duration of the reaction in the mixture was of about 20 minutes.

The initially obtained product containing an excess of hydrated lime has been discarded.

The obtained product was a mixture containing about 29.5% of hydrated lime and about 70.5% of plaster.

An analysis of the obtained product did not reveal the presence of calcium oxide and calcium sulphate in said product.

EXAMPLE 2

In the mixer of FIG. 1, 720 kg. of phosphogypsum containing 10% of moisture ($m=1.06$) i.e. 72 kg. of water, have been mixed with 280 kg. of powdery quicklime.

Due to the high proportion of free water contained in the phosphogypsum, the temperature of the mixture has quickly reached a value of 160° C. which remained constant during the reaction period.

The above amounts of moist phosphogypsum and quicklime have been progressively introduced into the mixer during three hours.

The final product contained about 600 kg. of plaster and about 400 kg. of hydrated lime.

No residual calcium oxide and dihydrated calcium sulphate were found in the product.

What I claim is:

1. A process for obtaining a building material containing hydrated lime and plaster in a proportion of 1 to 9 parts by weight of plaster for 1 part by weight of hydrated lime by reaction of quicklime with gypsum, in which dry solid phosphogypsum and powdered quicklime are mixed together, the amount of quicklime being at least of about 1 part by weight for about 4 parts by weight of dry solid phosphogypsum.

2. A process according to Claim 1 in which the reaction takes place in a reaction zone wherein a water saturated atmosphere is maintained.

3. A process according to Claim 2, in which the excess of water produced by the reaction is removed from the reaction zone in the vicinity of the place where the obtained mixture of hydrated lime and plaster is discharged from said zone.

References Cited

UNITED STATES PATENTS

| | | | |
|---|---|---|---|
| 3,159,497 | 12/1964 | Yamaguchi | 106—89 |
| 2,127,952 | 8/1938 | Choate | 106—110 |
| 120,672 | 11/1871 | Scott | 106—110 |
| 2,063,488 | 12/1936 | Choate et al. | 106—110 |
| 3,489,583 | 1/1970 | Bloom et al. | 106—109 |

FOREIGN PATENTS

| | | | |
|---|---|---|---|
| 10,130 | 4/1914 | Great Britain | 106—110 |
| 1,187,664 | 6/1968 | Great Britain | 106—110 |

DELBERT E. GANTZ, Primary Examiner

JAMES W. HELLWEGE, Assistant Examiner

U.S. Cl. X.R.

106—118